(No Model.) 2 Sheets—Sheet 1.

B. D. ADAMS.
LAWN MOWER.

No. 491,914. Patented Feb. 14, 1893.

Witnesses
J. Jensen
C. J. Hawley

Inventor
Benjamin D. Adams
By Paul Synnwin att'ys.

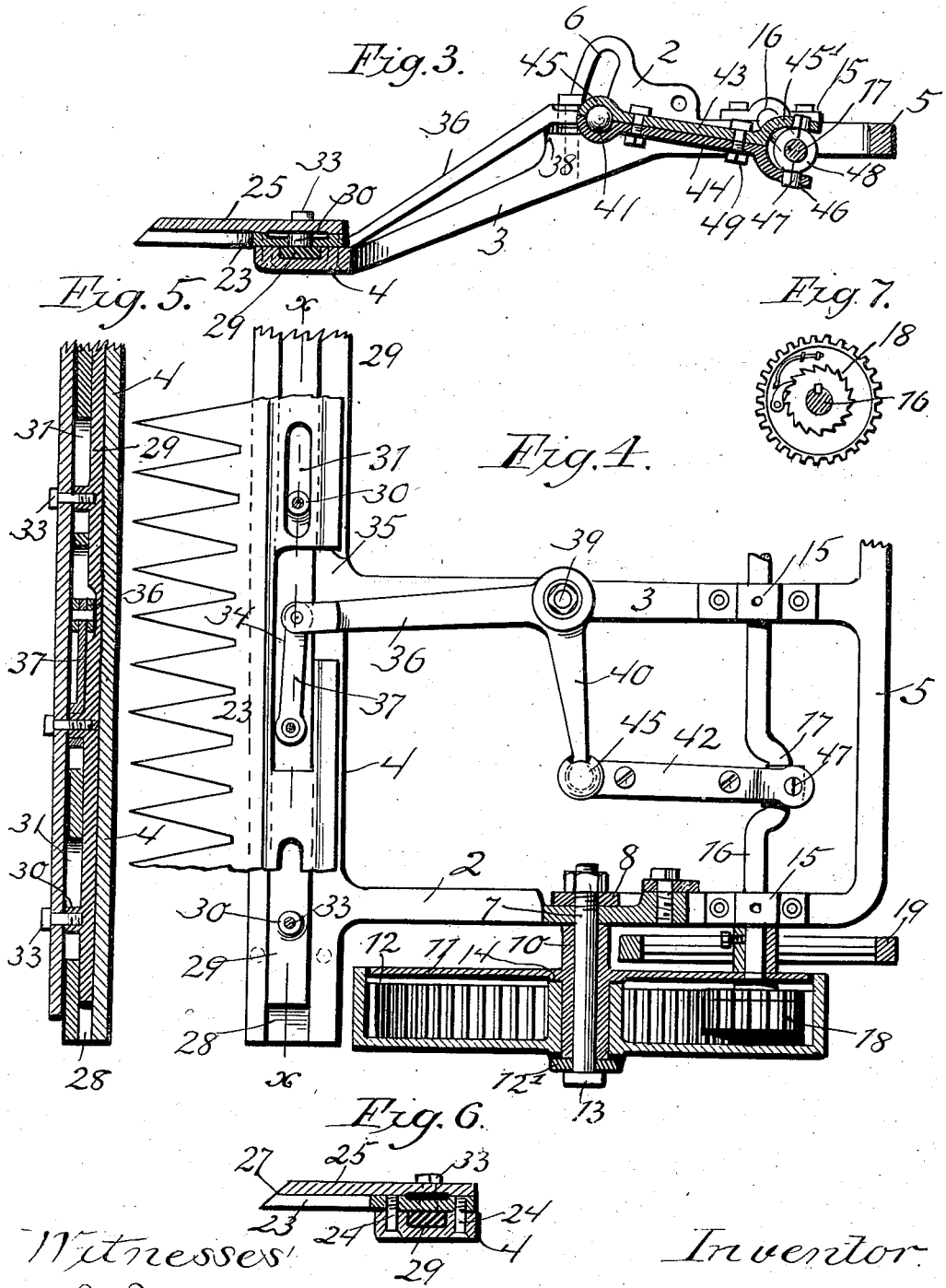

UNITED STATES PATENT OFFICE.

BENJAMIN D. ADAMS, OF MINNEAPOLIS, MINNESOTA, ASSIGNOR OF ONE-HALF TO JAMES H. HOWARD, OF SAME PLACE.

LAWN-MOWER.

SPECIFICATION forming part of Letters Patent No. 491,914, dated February 14, 1893.

Application filed March 7, 1892. Serial No. 424,000. (No model.)

*To all whom it may concern:*

Be it known that I, BENJAMIN D. ADAMS, of Minneapolis, in the county of Hennepin and State of Minnesota, have invented certain Improvements in Lawn-Mowers, of which the following is a specification.

My invention relates to lawn mowers, and its object is to provide in a practical and compact shape a convenient form of lawn mower of the reciprocating cutter bar type.

To this end my invention consists in a particular construction whereby a swath of the full width of the machine or of a greater width may be cut without any portion of the machine passing over the uncut grass, and further in various novel constructions and combinations all as hereinafter described and particularly pointed out in the claims.

My invention will be more readily understood by reference to the accompanying drawings in which:—

Figure 1:
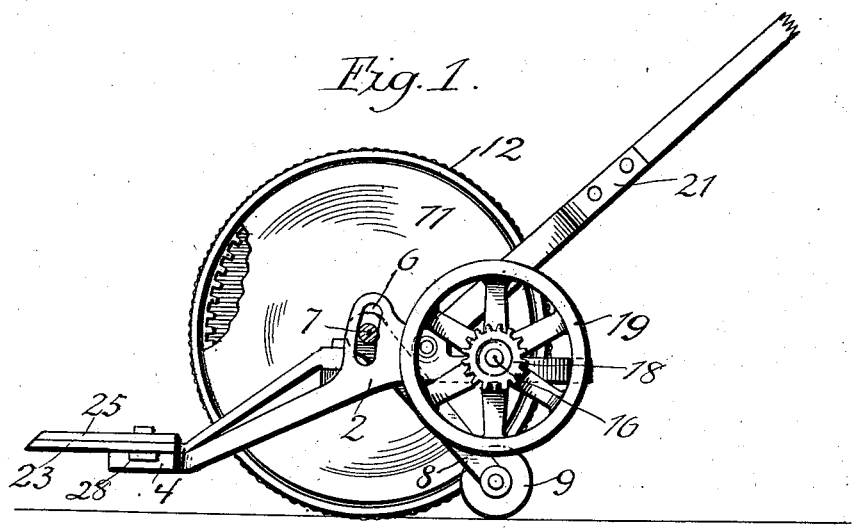
Figure 2:
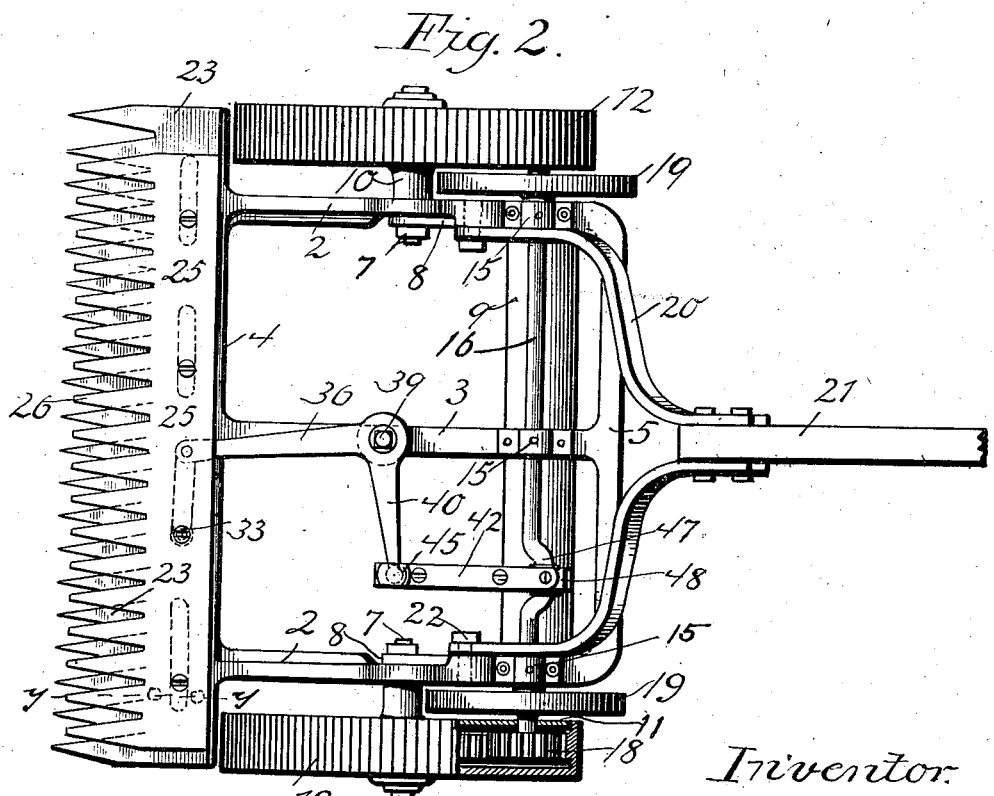

Figure 1 is a side elevation of a lawn mower embodying my invention, one of the driving wheels being removed and the axle-bolt thereof shown in section, a portion of the shield being broken away to show the interior gear of the driving wheel. Fig. 2 is a plan view with a portion of the driving wheel and shield broken away to show the ratchet pinion. Fig. 3 is a vertical sectional elevation of the frame of the machine and the pitman rod. Fig. 4 shows a portion of the machine in section and parts of the same being broken away. Fig. 5 is a vertical section on the line $x—x$ of Fig. 4. Fig. 6 is an enlarged section on the line $y—y$ of Fig. 2. Fig. 7 is a detail view of the ratchet pinion upon the crank shaft.

As shown in the drawings, my machine is made up of a strong rectangular frame having the inclined and angular side bars 2, and a similar metal section or bar 3 and the front bar 4, the frame being completed by the rear section 5. In the sides of this frame are the slots 6 adapted to receive the bolts 7, shown in detail in Fig. 4. These bolts also engage the upper ends of the arms 8 wherein the roller 9 is secured. Each bolt extends through a bushing or sleeve 10 provided with the circular shield 11 adapted to fit within the side of the internal gear wheel 12. The outside of each wheel 12 is solid and is secured upon the outer end of the sleeve 10 by a washer 12' and the head 13 of the bolt. The wheel works freely between the washer 12' and the annular shoulder 14 formed on the inside of the disk or plate 11. The rear portion of the frame is substantially on a level with the axis of the large drive wheels and lies in a horizontal plane, the frame being held from tilting by the rigid connection between the arms 8 and the middle part of the frame. On this rear portion of the frame and secured in bearings 15 I provide the shaft 16 having the small crank 17. The ends of this shaft project through the disks 11 of the two drive wheels and on these ends I secure the ratchet gear pinions 18 adapted to mesh with the internal gears of the drive wheels 12.

Between the inner sides of the drive wheels and the sides of the frame I provide the two fly wheels 19 fixed upon the shaft. The upper sections of the bearing box 15 are made removable as shown to permit the removal of the crank shaft. The lower ends of the yoke 20 of the handle 21 are fastened upon the frame by the bolts 22 extending into the frame at a point back of the drive wheel shafts or bolts. The dip of the forward part of the frame carries the front bar 4 thereof close to the ground. The ends of this bar it will be seen extend beyond the sides of the frame and the bar is of the same or a greater length than the distance between the outer sides of the drive wheels. Upon this front bar 4 I secure the toothed plates 23, the same being secured thereon by the short screws 24 shown clearly in Fig. 6. The sections or teeth of this plate are deeply cut and longer than the teeth of the reciprocating cutter bar 25 which lies upon the top of the same. The teeth 26 of the cutter bar are sharpened similarly to those of the mowing machine sickle, and the ends of both sets of teeth are beveled forward and downward as shown at 27 in Fig. 6.

The manner of securing the reciprocating cutter bar upon the plate 23 is shown clearly in Figs. 3, 4, 5 and 6 where it will be seen that the front bar 4 of the frame is provided with a longitudinal groove 28 adapted to receive a small bar or strip 29 provided with three or more upwardly extending lugs 30. These lugs operate backward and forward in the long slots 31 provided in the fixed plate 23 and the cutter bar is secured upon the tops of the lugs by the short bolts or screws 33 extending through the part 25 into the same. The rear and middle parts of the plate 23 are provided with the long slot 34 and the gap 35, through which the lower end of the arm 36 of the bell crank extends. This lower end is pivotally connected with the slide bar 29 and the cutter bar 25 by the link 37 secured between the same, as shown plainly in Fig. 4. This bell crank is pivoted upon the shoulder 38 formed on the intermediate part 3 of the frame being secured thereon by the pivot bolt 39. The other arm 40 of the bell crank is provided with the ball end 41 which is secured in the forward end of the connecting rod 42. The construction of this connecting rod is shown clearly in Fig. 3. It is made of two similar parts 43 and 44 having the seats 45 to receive the end of the arm 40 of the bell crank. The other end of the rod has the yoke 45′, each arm of which is provided with a hole 46 adapted to receive the trunnion ends 47 of the divided bearing ring 48, which embraces the crank of the rod 16. The two parts of the connecting rod are fastened together by the bolt 49.

The operation of my mowing machine is as follows:—The cutter bar 25, which is shorter than the stationary part 23 by two teeth or sections, is rapidly reciprocated by the throw of the bell crank operated by the connecting rod extending from the crank shaft 17, which crank shaft is continuously driven as the machine is pushed forward, by the engagement of the small pinions 18 with the internal gears of the two drive wheels 12. The revolution of the shaft being balanced and steadied by the fly wheels 19 fixed thereon. When drawing back the machine the cutter bar will not be operated owing to the arrangement of the ratchets between the pinions 18 and the crank shaft. The construction of these ratchet pinions is shown in detail in Fig. 7. To alter the height of the cut it is only necessary to loosen the bolts 10, when the frame may be moved up or down with respect to the same, the bolts being confined in the backward-curved slots of the frame sides. Owing to the fact that the cutter bar or sickle goes before the machine and is of the same or greater width than the machine the device may be operated close to walls, fences or stones, or any other object upon the lawn thus doing away with the necessity of trimming out the corners at such places with the shears or hand sickle as is now the custom, and inasmuch as at no time does any part of the machine pass over the uncut grass the same is left free and straight and easy of access; a great advantage over the ordinary lawn mowers.

Having thus described my invention I claim as new and desire to secure by Letters Patent:—

1. The combination in a lawn mower, of a rectangular frame the drive wheels adjustably secured thereon, internal gears in said drive wheels, a crank shaft revolubly secured upon the rear part of said frame, pinions upon the ends of said crank shaft to engage said internal gears, a balance wheel or wheels arranged upon said crank shaft, the forwardly and downwardly inclined part of the frame, the reciprocating cutter bar arranged thereon, a bell crank connected therewith, a connecting rod extending between said bell crank and the crank shaft, and the rear supporting roller substantially as described.

2. The combination in a lawn mower, of the rectangular frame having the intermediate portion 3, and the side parts provided with slots as described, the drive wheels, the bolts for securing the same to said frame, the bolts passing through said slots therein, a crank shaft arranged on said frame, pinions thereon to be operated by said drive wheels, the front bar of the frame, the ends thereof projecting in front of the drive wheels, the toothed plates 23 secured upon said front bar, the reciprocating bar slidable thereon, the crank shaft pivoted on the part 3 of the frame and having its lower end secured to said cutter bar, and a connecting rod extending between the crank shaft and the upper arm of the bell crank, substantially as described.

3. The combination in a lawn mower, of the rectangular frame having the slotted side pieces and the intermediate part 3, with the sleeves 10, the drive wheels journaled thereon, the bolts for securing said sleeves and drive wheels upon the sides of the frame, said bolts being adjustable in the slots thereof, the disks 11 closing the inner sides of the drive wheels, said drive wheels provided with internal gears, ratchet pinions meshing therewith, a crank shaft extending across said frame and bearing said pinion, balance wheels thereon, the bell crank having the arms 36 and 40 and pivoted on the part 3, the ball end of the arm 40, the connecting rod 42 extending between the same and the crank shaft, the grooved forward bar of the frame, the slotted and toothed plate 23 fixed thereon, the strip arranged to operate in said groove and having lugs projecting through the slots of the plate 23, the cutter bar fixed upon said lugs, a link 37 connecting the same with the arm 36 of the bell crank and means for moving the machine forward, substantially as described.

4. The combination in a mowing machine, of the rectangular frame having the extended forward bar 4, with a toothed plate 23 fixed thereon and slotted, a strip 29 arranged to move in a groove provided in the bar 4, and having lugs 30, the cutter bar 25 secured upon said lugs by bolts or screws 33, means for operating said cutter bar, and the teeth thereof being shorter than those of the plate 23, substantially as described.

5. The combination in a mowing machine, of the driving-wheels provided with the internal gears, the integral rectangular frame having the intermediate part 3 and the downwardly extending forward portion, the cross bar 4 thereof, the crank-shaft arranged upon the rear part of said frame and having pinions meshing with said internal gears, the connecting rod or pitman, the bell-crank pivoted on said bar 3 and having the horizontal arm 40 connected with said pinion and the downwardly inclined arm 36, the toothed plate 23 secured upon the bar 4 and slotted, the bar 29 operating in the groove of said bar 4, the reciprocating cutter-bar 25 provided with the teeth and secured to the bar 29, said cutter-bar forming a complete closed top for the whole, and the lower end of the arm 36 being pivotally connected with the bar 29, substantially as described.

6. The combination with the driving-wheels, of the shields 11 for the inner sides thereof, said shields provided with the bearing sleeves whereon the said wheels are journaled the rectangular frame having the forward bar 4, the reciprocating cutter device arranged thereon, means for operating the same from said drive wheels, the bolts 7 and the rear roller 9 connected with said bolts and frame by the arms 8, substantially as described.

7. The combination with the driving wheels, of a rectangular frame, an operating shaft driven by said wheels, the bell-crank connected therewith, the forward grooved bar 4 of said frame, the strap 29 arranged in said groove and provided with lugs 30, the connecting bar 37 pivoted on one of said lugs and engaging the forward end of said bell-crank, the cutting teeth arranged upon the bar 4 and a cutter bar secured upon the upper ends of said lugs 30, substantially as described.

In testimony whereof I have hereunto set my hand this 3d day of March, 1892.

BENJAMIN D. ADAMS.

In presence of—
A. C. PAUL,
C. G. HAWLEY.